United States Patent [19]
Wakiyama

[11] Patent Number: 5,913,200
[45] Date of Patent: Jun. 15, 1999

[54] SYSTEM FOR AND METHOD OF WORKING OUT PRODUCTION START PLANS

[75] Inventor: Harumichi Wakiyama, Toyota, Japan

[73] Assignee: Toyota Jidosha Kabushiki Kaisha, Toyota, Japan

[21] Appl. No.: 08/590,418

[22] Filed: Jan. 24, 1996

[30] Foreign Application Priority Data

Feb. 2, 1995 [JP] Japan .................................. 7-016013

[51] Int. Cl.⁶ .................................................. G06F 17/60
[52] U.S. Cl. ........................................... 705/8; 364/468.1
[58] Field of Search ...................... 705/8; 364/468.1–13

[56] References Cited

U.S. PATENT DOCUMENTS

| | | | |
|---|---|---|---|
| 4,459,663 | 7/1984 | Dye | 705/29 |
| 4,887,218 | 12/1989 | Natarajan | 364/468.08 |
| 4,896,269 | 1/1990 | Tong | 364/468.07 |
| 4,956,784 | 9/1990 | Hadavi et al. | 364/468.08 |
| 4,958,292 | 9/1990 | Kaneko et al. | 364/468.13 |
| 5,040,123 | 8/1991 | Barber et al. | 364/468.06 |
| 5,148,370 | 9/1992 | Litt et al. | 364/468.1 |
| 5,231,567 | 7/1993 | Matoba et al. | 364/486.06 |
| 5,233,533 | 8/1993 | Edstrom et al. | 364/486.09 |
| 5,291,397 | 3/1994 | Powell | 364/468.03 |
| 5,319,781 | 6/1994 | Syswerda | 705/8 |
| 5,479,343 | 12/1995 | Matoba et al. | 364/468.13 |

FOREIGN PATENT DOCUMENTS

| | | | |
|---|---|---|---|
| A-41 16 277 | 12/1991 | Germany . | |
| A-1-234142 | 9/1989 | Japan | B23Q 41/08 |
| A-3-26448 | 2/1991 | Japan | B23Q 41/08 |

*Primary Examiner*—Allen R. MacDonald
*Assistant Examiner*—James W. Myhre
*Attorney, Agent, or Firm*—Oliff & Berridge, PLC

[57] ABSTRACT

An ideal production start plan is worked out from the time interval required from a production start till a shipment and a delivery term. In addition, a satisfaction degree which represents a degree of permission of a deviation from an ideal production start time instant, is obtained. When it is impossible to start production of a plurality of different product items at a time in an ideal plan, a preferential product item is determined by referring to the satisfaction degree. In this way, an actual plan is worked out from the ideal plan. The actual plan which is obtained in this way is capable of execution and close to the ideal plan.

23 Claims, 8 Drawing Sheets

| IDEAL PRODUCTION START PLAN | | | | | A1<br>A3<br>A4 | | A1x1 | A3x2 | A4x3 |
|---|---|---|---|---|---|---|---|---|---|
| CORRECTED IDEAL PRODUCTION START PLAN | | | | | | A3<br>A4 | A1 | A3 | A4 |
| SATISFACTION DEGREE | | | (0.7)<br>(0.6)<br>(0.6) | (0.9)<br>0.7<br>(0.6) | (1.0)<br>(0.8)<br>(0.8) | 1.0<br>(0.9)<br>(0.8) | (1.0)<br>(1.0) | (1.0) |
| ACTUAL PRODUCTION START PLAN | | | | A3 | A4 | A1 | A4 | A3 | A4 |

FIG.8

SYSTEM FOR AND METHOD OF WORKING OUT PRODUCTION START PLANS

BACKGROUND OF THE INVENTION

1. Field of the Invention

This invention relates to working out production start plans as to when and of what product item to start production in a production process, in which a plurality of different product items are produced.

2. Description of the Prior Art

Recently, it is an increasing trend to produce a plurality of different product items A1, A2, A3, A4, . . . in the same production process. Actually, such circumstances occur frequently that greater burden is imposed on an operator for producing the product item A1 while the burden is less for producing the product item A2. In such cases, it is often undesirable to formulate such a production start plan as to first produce the product items A1 continuously and start continuous production of the product items A2 after producing a necessary quantity of the product item A1. Japanese Laid-Open Patent Publication No. 3-26448 discloses a technique of working out a desired production start plan under such circumstances as noted above. In this technique, when producing the product item A1 in quantity B1, the product item A2 in quantity B2 and the product item A3 in quantity B3 in the same production process, a production start sequence is worked out in which the production start intervals between adjacent ones of the successively produced same kind of product items are as uniform as possible. To this end, such a mathematical means is adopted as to obtain appearance trend values from the production quantities B1, B2, B3, B4, . . . and determine the production start sequence from the obtained appearance trend values. This means can level the operator's burden.

The prior art production start plan work-out method aims at leveling the operator's burden. However, the operator's burden is leveled without knowledge of when and of what product item the shipment is to be made during a period of continuation of the leveled production activity. Therefore, an excessive or insufficient stock situation takes place chronically. In other words, the prior art production start plan work-out method pursues only the easiness of production, and this rather leads to a likelihood of spoiling the economy of the production process.

SUMMARY OF THE INVENTION

In the light of the above deficiencies inherent in the prior art, the invention seeks to provide a technique of working out a production start plan which minimizes the irrationality and waste in the production process.

The production start plan work-out system according to the invention comprises accepted order memory means, production condition memory means, ideal production start time calculating means, satisfaction degree memory means, and actual production start time calculating means.

As shown in FIG. 1, the accepted order memory means memorizes the quantity and the delivery term of each ordered product item ($21a$). The production condition memory means memorizes the time interval required from the production start till the shipment of each product item ($22a$). The ideal production start time calculating means calculates the ideal production start time ($25a$) from the accepted order specifications ($21a$) and the production conditions ($22a$). The actual production start time calculating means calculates the actual production start time ($27a$) from the ideal production start time ($25a$) and the satisfaction degree ($24a$).

The production start plan work-out system first calculates the ideal production start time $25a$. The calculated ideal production start time $25a$ is such that production started at this time is just completed in the delivery term. It is frequently the case that it is actually difficult to carry out production according to the calculated ideal production start time $25a$. For example, simultaneously starting production of the product item A1 in the quantity B1 and the product item A2 in the quantity B2 may be actually impossible although it is ideal. This may be so because it is impossible to start production in excess of the production start capacity.

The production start plan work-out system uses an index called satisfaction degree $24a$ in a step of calculating the actual production start time $27a$ from the ideal production start time $25a$. The satisfaction degree $24a$ is a permissible degree corresponding to a deviation from the ideal production start time relative to the actual production start time. For example, for a product item of which the production for stock does not lead to any significant stock space shortage problem, a high satisfaction degree corresponding to a considerably great deviation is given. Conversely, for a product item which is difficult to produce for stock, the satisfaction degree is subtly reduced with increasing deviation.

By using the satisfaction degree $24a$ as an index, it is possible to work out an actual production start plan which, when it is difficult to carry out an ideal production start plan, permits a plan close to the ideal one with preference to product items which are difficult to produce for stock and, for product items which can be produced for stock, avoids spoiling the production start of the product items difficult to produce for stock. The system permits working out an actual production start plan which can well harmonize the ideal and the reality.

The satisfaction degree $24a$ noted above as an index suitably ranges from a lowest degree to a highest degree, the lowest degree corresponding to deviations H1, H2, . . . which lead to excessive stock, the highest degree corresponding to deviations G1, G2, . . . which provide for permissible stock.

By using the satisfaction degree, an actual production start time is calculated in a permissible stock range as much as possible, and when this is impossible, a production start time with which the excessive stock state is as less significant as possible is calculated.

The means for calculating the actual production start time $27a$ from the ideal production start time $25a$ and the satisfaction degree $24a$, suitably calculates the actual production start time by tracing back the ideal production start time $25a$.

In this way, it is possible to work out an actual production start sequence in ranges not leading to stock shortage and also such as to avoid unnecessarily long stock time. It is thus possible to avoid unnecessarily early production of particular product items while avoiding delay of production of necessary product items.

When calculating the actual production start time $27a$ retroactively, preference is suitably given to product items with lower satisfaction degrees. In this way, the actual production start time $27a$ can be calculated in a relatively simple process, and the calculated production start time generally provides for a high satisfaction degree. The algorithm of giving preference to product items with lower satisfaction degrees when calculating the actual production start time by using the satisfaction degree, is only one form of the invention. Although this algorithm has a merit that it can be readily carried out, there are other algorithms which permit determining the actual production start time 27a with higher accuracy.

The system suitably further comprises means for displaying the satisfaction degree along with the calculated actual production start time 27a. In this case, it is possible to evaluate the satisfaction degree of the actual production start time, and measures for further approaching the ideal can be more readily taken. The satisfaction degree further accurately shows the economy of the production process, thus permitting a satisfactory management index to be obtained.

BRIEF DESCRIPTION OF THE DRAWINGS

The above and other objects, features and advantages of the invention will become more apparent from the preferred embodiments of the invention given hereinunder when the same is read with reference to the accompanying drawings, in which:

FIG. 8 is a view showing the progress of a process in the second embodiment.

DETAILED DESCRIPTION OF THE PREFERRED EMBODIMENTS

Figure 2:
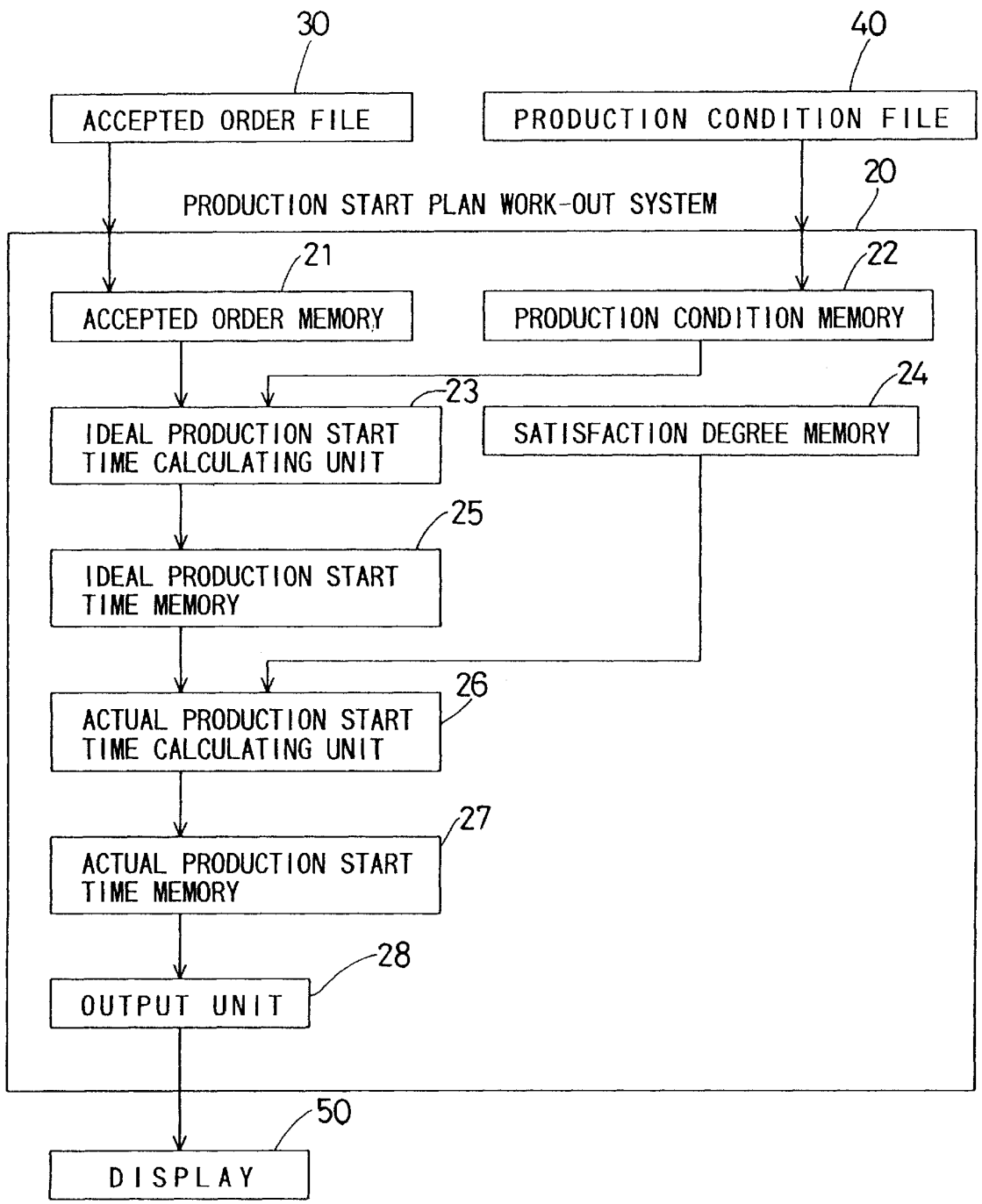
FIG. 2 is a view showing the system formation of the first embodiment.

The invention will now be described in conjunction with some preferred embodiments thereof. FIG. 2 shows the system formation of a production start plan work-out system 20 in an embodiment of the invention. The system 20 comprises a usual computer having a working memory, a processing unit and a program memory, and its hardware formation is not described. An accepted order file 30 and a production condition file 40 are connected to the system 20, and the system 20 is connected to a display 50.

Figure 1:
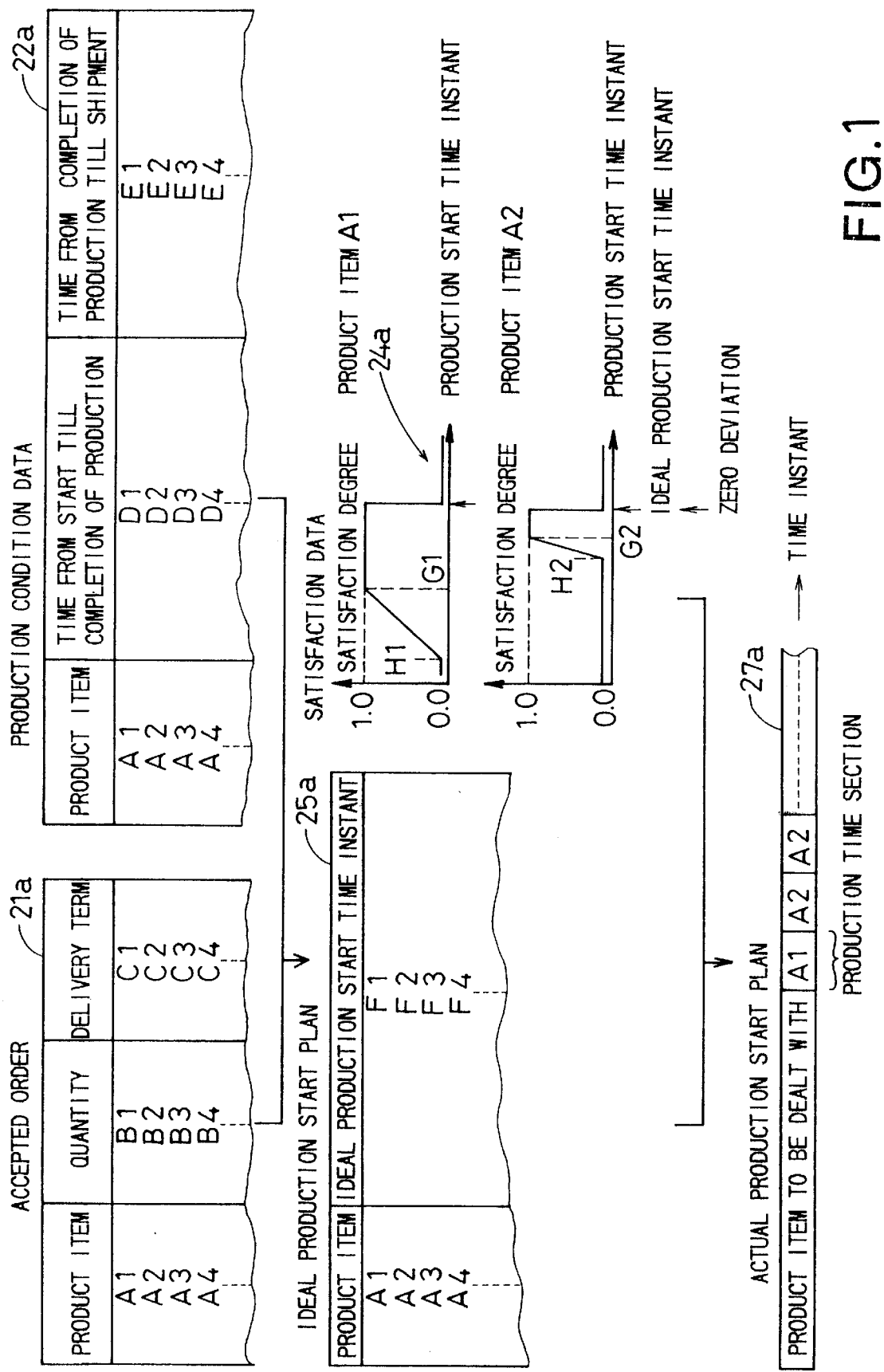
FIG. 1 is a view schematically showing the manner of operation in a first embodiment of the invention.

The accepted order file 30 memorizes accepted order specifications from each of customer companies. When this file 30 is installed in a motorcar manufacturer, orders from car sales branches all over the country are memorized. In addition, orders from company departments are further memorized. For example, when and what quantity of a specific kind of engine a car assembling factory requires from an engine manufacturing factory is memorized. The production start plan work-out system 20 is provided in each factory, and data of order accepted by the factory is extracted from the accepted order file 30 and is stored in an accepted order memory 21. An example of accepted order specifications 21a is shown in FIG. 1. In this case, the factory is ordered to ship product items A1 (i=1, 2, 3, 4, . . . ) in quantities Bi in delivery terms Ci. This accepted order data suitably includes order source data, i.e., data indicative of after-process in view of the product distribution route.

The production condition file 40 in FIG. 2 memorizes the time Di required from the production start till the completion of production and the time E1 from the completion of production till the shipment of each product item Ai. Among these data, the data of product items to be manufactured in the factory are stored in the production condition memory 22. The production condition data 22a shown in FIG. 1 exemplifies a portion of the stored contents in the production condition memory 22. Since the shipment status varies with the after-process, the time required from the production start till the shipment may vary with the same product item in dependence on the after-process. In such a case, time is memorized for each combination of the product item and the after-process.

Figure 3:
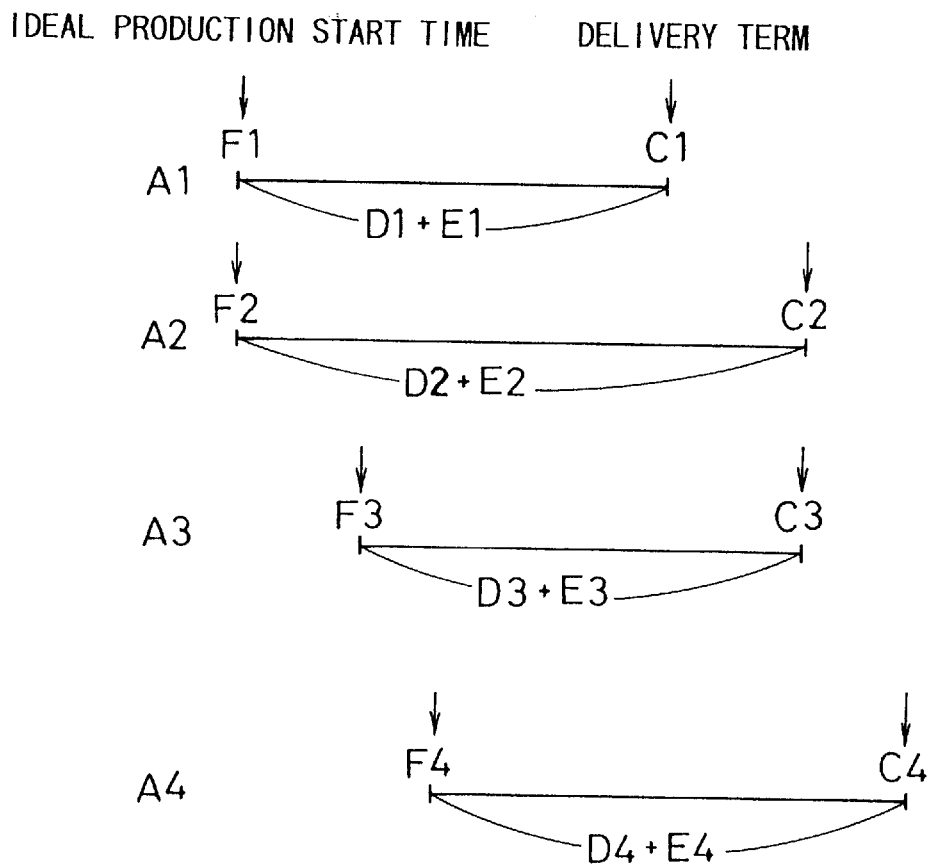
FIG. 3 is a view schematically showing a step of calculating ideal production start time.

An ideal production start time calculating unit 23 is realized by a processing function of the computer 20, and it calculates the ideal production start time 25a in a manner as shown in FIG. 3. In FIG. 3, C1 designates the delivery term of the product item A1 which is memorized in the accepted order memory 21, and Di+Ei designates the time required from the production start till the shipment of the product item Ai which is memorized in the production condition memory 22. The ideal production start time 25a that is calculated in this way, represents an ideal time instant Fi of production start time just necessary for meeting the delivery term Ci. The ideal production start time 25a calculated in this way is memorized in an ideal production start time memory 25 in FIG. 2. Exemplified at 25a in FIG. 1 is an example of the memorized contents. Again in this case, the stored data may include after-process data.

A satisfaction degree memory 24 is provided in a memory of the production start plan work-out system 20, and satisfaction degree data is stored in the memory 24. The satisfaction degree is memorized for each product item, and it is determined in correspondence to a deviation from the ideal production start time instant. Exemplified at 24a in FIG. 1 is an example of the stored satisfaction degree data. The satisfaction degree is highest (i.e., 1.0 in this case) irrespective of the product item when the deviation from the ideal production start time relative to the actual production start time is zero. With ordinary product items, certain satisfaction degree intervals are allowed, and slightly early production start has no adverse effects. In case of FIG. 1, the satisfaction degree range is broader with the product item A1 than with the product item A2. Shown at G1 and G2 are threshold time instants which provide for permissible stock. When the production is started later than the instants G1 and G2, the satisfaction degree is highest. When the production is started earlier, on the other hand, the satisfaction degree is reduced. Shown at H1 and H2 are production start time instants which lead to excessive stock. That is, starting the production earlier than the instants H1 and H2 leads to excessive stock and results in the lowest satisfaction degree (i.e., 0.0 in this case). The satisfaction degree data may be inputted by the operator from an input unit of the computer constituting the system 20. In addition, the input satisfaction degree data may be corrected by the operator. In the FIG. 1 example, the satisfaction degree is determined absolutely with each product item. However, when the shipment status varies with the after-process, the satisfaction degree may not be determined only by the product item but may vary with the after-process. In such a case, satisfaction degree data is provided for each combination of the product item and the after-process.

Figure 4:
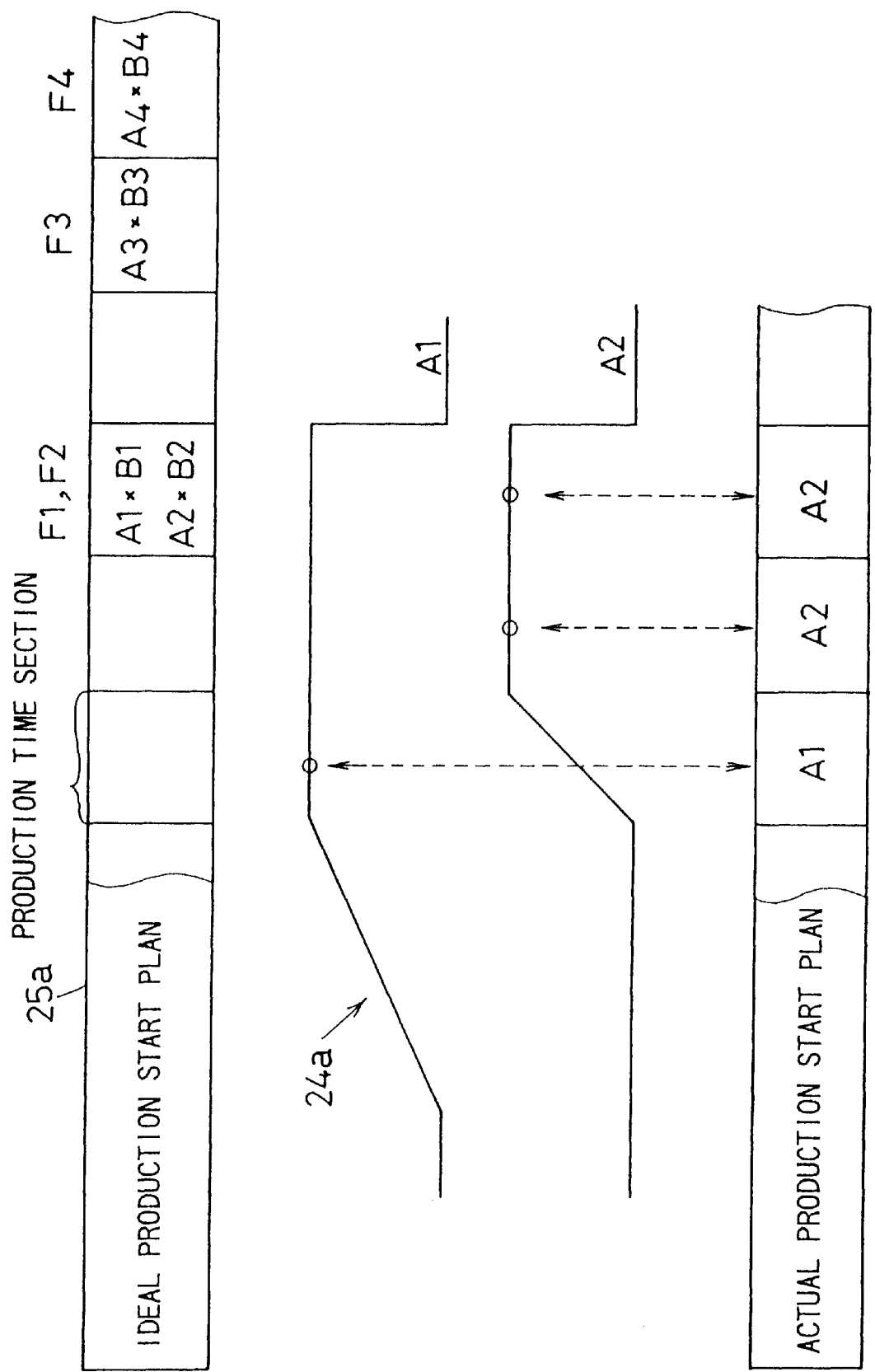
FIG. 4 is a view schematically showing a step of calculating actual production start time from ideal production start time.

An actual production start time calculating unit 26, shown in FIG. 2, calculates the actual production start time according to the ideal production start time 25a and the satisfaction degree 24a. FIG. 4 schematically exemplifies the actual production start time calculation step. In this case, it is ideal to start production of the product item A1 in quantity B1 and the product item A2 in quantity B2 at time instant F1 (=F2). In such a case, the production of the quantities B1 and B2 cannot be started simultaneously, that is, the reality cannot be in accord with the ideal. From the consideration of the satisfaction degree, however, the example indicates that in producing two units of the product item A2 and one unit of the product item A1, it is possible to meet the highest satisfaction degree by producing one unit of the product item A1, one unit of the product item A2 and one unit of the product item A2 in successive production time sections. As shown, even when the ideal cannot be met, the use of the satisfaction degree as an index can work out an actual production start plan which does not spoil the ideal or, in a worse case, which is closest to the ideal plan. Specifically, when the ideal production start plan surpasses the production start capacity, a process is executed in which a portion of the plan that is incapable of execution is traced back in time while giving preference to product items with lower satisfaction degrees.

An actual production start time memory 27 in FIG. 2 memorizes the calculated actual production start time. FIG. 6 shows an example of actual production start plan worked out from the procedure shown in FIG. 5 which will be described later. This actual production start plan is coupled through an output unit 28 to the display 50 for display. From the satisfaction degree data on the display 50, the production process manager can readily understand an index indicative of how much the actual plan is close to or distant from the ideal one and thus can accurately grasp the management status.

The operator may start production of successive product items according to the actual production start plan displayed on the display 50. In this way, the production activity can proceed in a sequence close to the ideal one in actually permissible ranges. Consequently, production can be made in a production start sequence which does not lead to stock shortage nor excessive stock, thus significantly improving the economy in the manufacturing processes.

Figure 5:
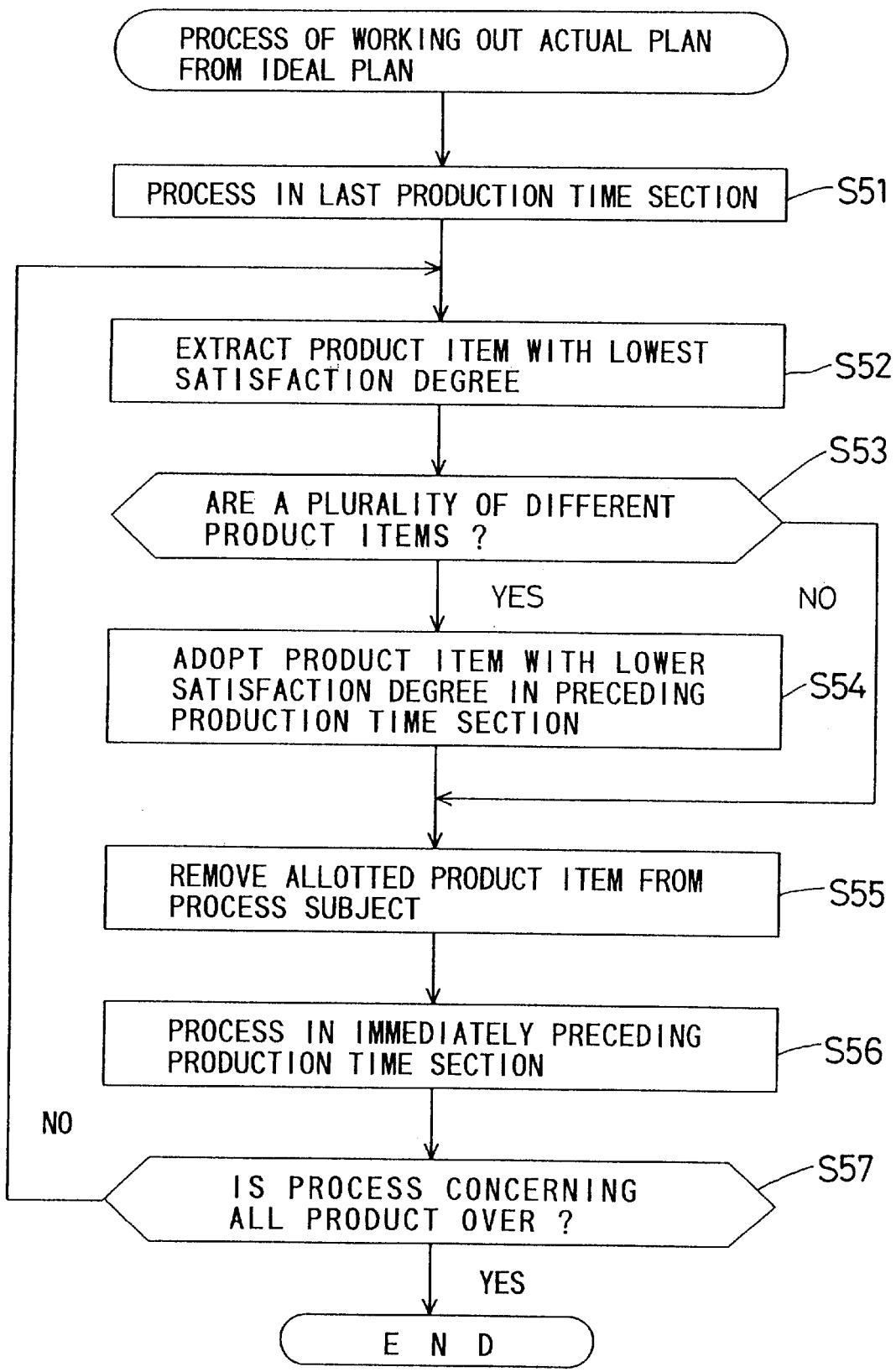
FIG. 5 is a view showing an example of algorithm of calculating actual production start time from ideal production start time.
Figure 6:
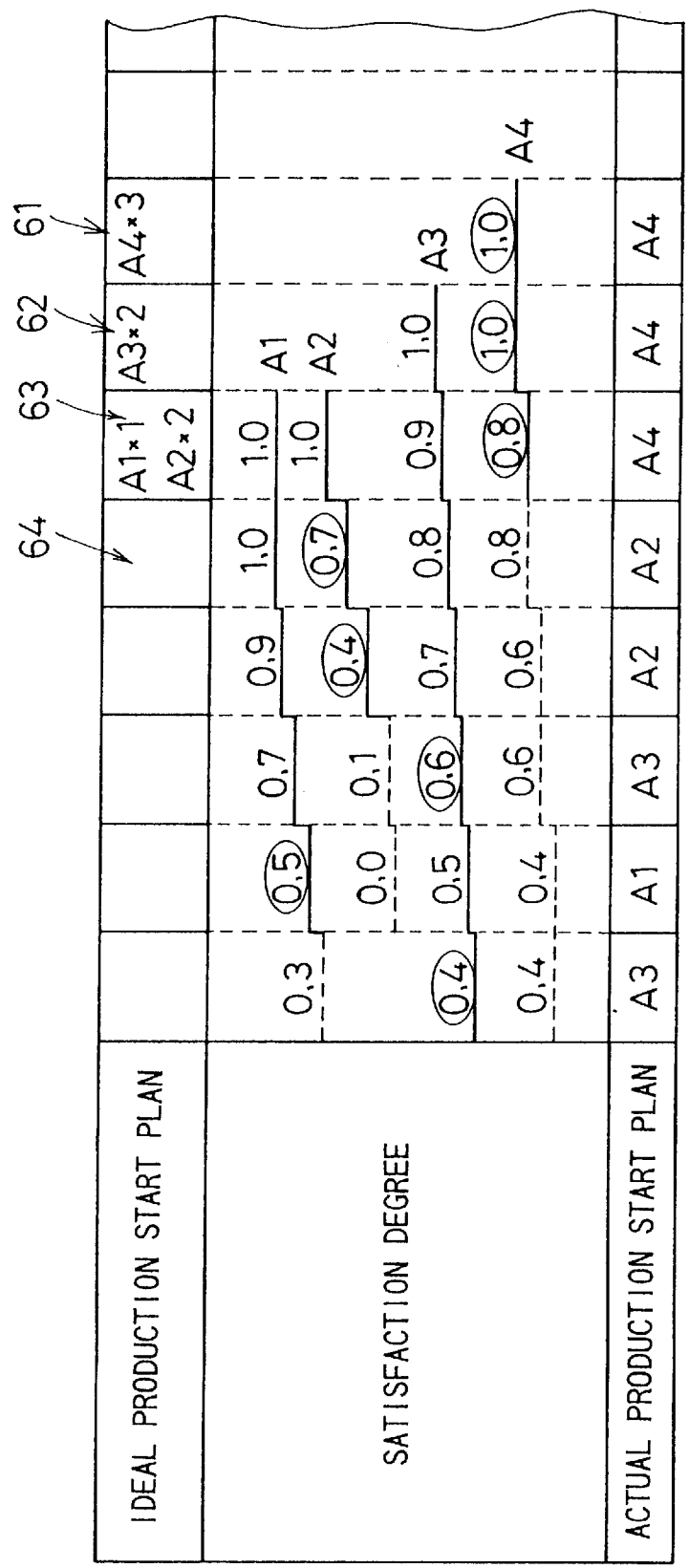
FIG. 6 is a view showing the progress of a process with the FIG. 5 algorithm.

FIG. 5 shows an example of algorithm of calculating the actual production start time 27a from the ideal production start time 25a. This algorithm has a merit that it can be easily executed, but it still has problems in view of working out an actual plan which is very close to the ideal one. The algorithm of this embodiment is by no means limitative.

In the algorithm, first the last production time section is taken as the subject to be dealt with (step S51). In the following description, it is assumed that production time section 61 shown in FIG. 6 is the last production time section. In step S52, a product item with the lowest satisfaction degree in this production time section is retrieved for. In the production time section 61 in FIG. 6, only the product item A4 is the subject of production. In this case, a satisfaction degree of 1.0 is extracted for the product item A4. Since in this case only a single production item is the subject of production, step S53 provides "NO", and the subject product item A4 is allotted to the production time section 61. With one unit of the product item A4 allotted to the production time section 61, in step S55, one unit of the product item A4 is removed from the subsequent subject to be dealt with, that is, two units of the product item A4 are the subsequent subject.

In subsequent step S56, the immediately preceding production time section, i.e., production time section 62 in FIG. 6, is made the subject production time section. This time, a satisfaction degree of 1.0 for the production item A3 and the same satisfaction degree of 1.0 for the product item A4 are extracted in step S52. In this case, step S53 provides "YES", and further preceding production time section 63 is referred to. In this case, the satisfaction degree is 0.9 for the product item A3 and 0.8 for the product item A4, and the product item A4 with the lower satisfaction degree is made the subject in the production time section 62 of this time (step S54). In subsequent step S55, one unit of the product item A3 is made the subject to be dealt with. The above routine is executed repeatedly for all the product items until completion of all the quantity. In this way, the actual production start time is calculated by tracing back the ideal production start plan and giving preference to product items with lower satisfaction degrees. Dashed lines in FIG. 6 represent the satisfaction degrees of the allotted product items.

As a result of the above process, an actual production start plan is calculated as shown in the bottom of FIG. 6. In this plan, when the plan is not in accord with the ideal, preference is given to product items which are with low satisfaction degrees and which can be produced earlier without a serious problem. The plan thus can be actually executed. Besides, the satisfaction degree is generally close to be ideal. More specifically, in steps S52 to S54, the individual satisfaction degrees are noted, and plans closer to the ideal ones are worked out for product items which are with lower satisfaction degrees and which cannot be produced much more for stock. Thus, from the collective evaluation of the result of the FIG. 5 process, it is seen that a production start plan with uniform satisfaction degrees is obtainable.

On the display 50, the satisfaction degrees shown in FIG. 6 are displayed as graphs in correspondence to the actual production start times. This graphical display can extremely facilitate the evaluation and/or correction of plan. For example, with respect to the production time sections 63 and 64, it will be seen that exchange of the allotments of the product items A2 and A4 is possible and permits a condition closer to the ideal. Also, it will be seen that the product item A4 can be readily produced for stock and that its allotment to production time sections preceding the sections 62 and 63 will have no substantial adverse effect. It is further possible to accurately grasp the extents of irrationality and waste in this plan.

A still further advantage is that when the worked-out plan fails to gain satisfactory evaluation, a new plan can be worked out afresh by changing production conditions or the like. The evaluation may be made by using the average value of adopted satisfaction degrees. Sometimes, the lowest satisfaction degree may be used. As for the production condition change, the production time section may be varied in a permissible range. The variation of the production time section may improve the satisfaction degree in general.

Figure 7:
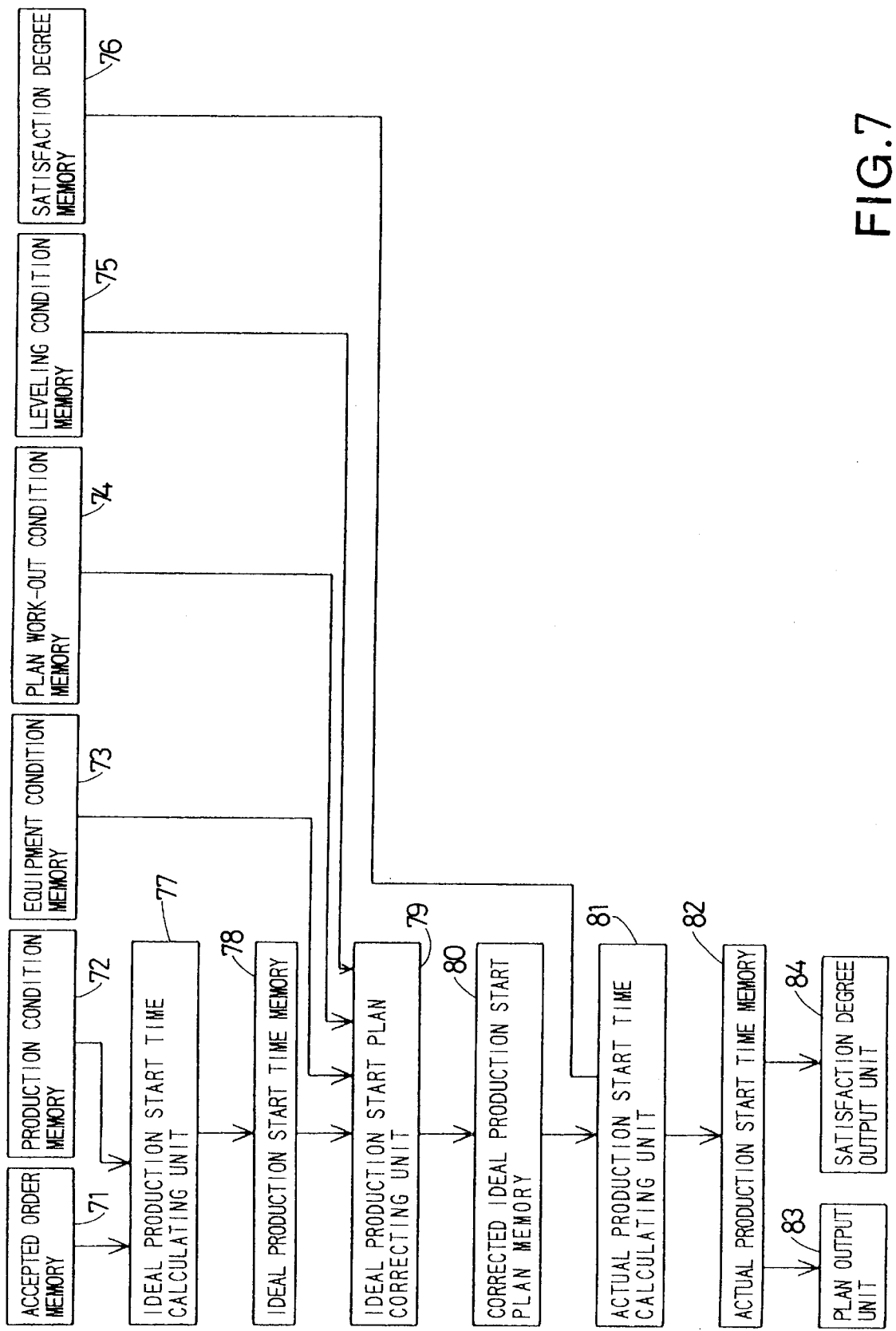
FIG. 7 is a view showing the system formation of a second embodiment of the invention.

A second embodiment of the invention will now be described. The production start plan work-out system in the second embodiment is the same in hardware as the first embodiment, that is, it comprises a usual computer. FIG. 7 shows the system formation in the second embodiment like that shown in FIG. 2.

In the FIG. 7 system, an accepted order memory 71, a production condition memory 72, a satisfaction degree memory 76, an ideal production start time calculating unit 77 and an ideal production start time memory 78 are the same as those in the first embodiment. While in the first embodiment, the actual production start plan is worked out directly from the ideal production start plan, in the second embodiment, necessary corrections of the plan are made in accordance with actual circumstances.

Correction data is stored in memories 73 to 75. The memory 73 is an equipment condition memory in which restricting conditions mainly from the equipment standpoint, such as the period during which production is possible, the shortest production time section during which production is possible, the possible production quantity, etc., are memorized. The memory 74 is a plan work-out condition memory in which conditions provided mainly from the management standpoint for plan work-out, such as the duty service time (which may vary in dependence on such factor as whether non-duty service time is to be provided), the actually adopted production time section, etc., are memorized. The memory 75 is a leveling condition memory, in which conditions for leveling the operator's burden which have not been considered in the first embodiment are memorized. For example, such a condition is memorized that the product item A3 cannot be produced in successive production time sections but, from the standpoint of the leveling of the operator's burden, is suitably produced in intermittent subject production time sections with at least two non-subject production time sections provided between adjacent subject sections.

The ideal production start time that is calculated in the ideal production start time calculating unit 77, although it is superficially ideal, may not actually be ideal because it does not contain such elements as the restricting conditions from the equipment standpoint, the labor conditions from the management standpoint, or leveling of the operator's burden. In the second embodiment, necessary corrections of the plan are made in an ideal production start plan correcting unit 79 with reference to the conditions memorized in the equipment condition memory 73, the plan work-out condition memory 74 and the leveling condition memory 75. The corrected ideal production start plan is memorized in a corrected ideal production start plan memory 80. FIG. 8 shows an example of an ideal production start plan 78a before correction and that 80a after correction. In this example, the ideal plan 78a is corrected mainly with reference to the leveling conditions. In this case, the product items A3 and A4 are allotted to distributed production time sections for the purpose of the leveling. The correction may be made not only according to the leveling conditions, but also the relation between the production time sections and the product items may be corrected by increasing or reducing the actual production time sections.

After the ideal production start plan has been corrected in the above way, in the second embodiment, the actual production start plan 82a is worked out by tracing back the corrected ideal production start plan while taking the satisfaction degree into consideration. In a production time section 85, it is only the product item A4 that can be allotted, so the product item A4 is allotted. In the next production time section 86, it is only the product item A3 that can be allotted, so the product item A3 is allotted. In FIG. 8, satisfaction degrees which are not process subjects are enclosed in parentheses. In production time section 87, the product items A1 and A4 are process subjects, and the product item A4 with a lower satisfaction degree is preferentially allotted. The routine described above is executed repeatedly to calculate the actual production start plan 82a.

In the technique of the second embodiment, the leveling conditions are considered to a certain extent. In other words, while the first embodiment ignores burden leveling and attaches importance to the freedom from the stock shortage and/or excessive stock, in the second embodiment, the burden leveling factor is taken into consideration to work out an actual production start plan while permitting slight increase of the stock time. The first embodiment is preferred in case when the operator's burden is not substantially varied with the product item, while the second embodiment is preferred in case when the operator's burden is varied greatly.

In the above description, it has been assumed that the unit of the quantity of production items is the lot. In case when the order specifications adopt a quantity unit other than the lot, a unit conversion step is necessary. When the quantity unit or number of lots is varied in the after-process, different unit conversion formulas are adopted in the after-process.

As has been described in the foregoing, according to one aspect of the invention, an ideal production start plan which just meets specifications of an order is worked out from the order specifications and the production conditions. When the ideal production start plan cannot be carried out, an actual production start plan is worked out by using the satisfaction degree representing the degree of permission of a deviation from the ideal production start time as an index. Specifically, for a product item with which the deviation is significant, a plan which is close to the ideal one is provided preferentially, while for a product item with which the deviation is not so significant, a plan is provided which is such as not to disturb the production start of the product item with which the deviation is significant. In this way, a plan which can be actually executed and which is close to the ideal plan as a whole is worked out.

When the satisfaction degree ranges from a lowest degree corresponding to a deviation which brings about excessive stock to a highest degree corresponding to a deviation which provides permissible stock, primarily an actual production start plan in a permissible stock range can be worked out and, even otherwise, a plan which does not bring about excessive stock can be worked out. In this process, it is suitable to trace back the ideal production start plan. By so doing, an actual production start plan can be obtained, which does not cause stock shortage and permits reducing unnecessary stock time. Particularly, by giving preference to product items with lower satisfaction degrees while tracing back the ideal plan, it is possible to work out a comparatively desirable actual plan with a simple logic. That is, it is possible to work out a production start plan with a rather high satisfaction degree in general evaluation. When the satisfaction degree is displayed in combination, the degree of satisfaction of the worked-out actual production start plan can be grasped objectively and can be readily corrected, if necessary, which is very suitable. This satisfaction degree can be made effective use of as a management index.

While some preferred embodiments of the invention have been described, it is to be construed that changes and modifications may be made in the details of the design without departing from the spirit and scope of the invention as set forth in the appended claims.

What is claimed is:

1. A computerized system for working out production start plans comprising:
   accepted order memory means for storing accepted order specifications defining a quantity and a delivery term of each ordered product item;
   production condition memory means for storing production conditions defining a time interval required from a production start until a shipment of each product item;
   ideal production start time calculating means for calculating an ideal production start time from the accepted order specifications and the production conditions;

satisfaction degree memory means for storing a satisfaction degree corresponding to a deviation from the ideal production start time of each ordered product item relative to an actual production start time;

actual production start time calculating means for calculating an actual production start time from the ideal production start time and the satisfaction degree; and production plan generating means for generating a production start plan based on the actual production start time.

2. The system according to claim 1, wherein the satisfaction degree ranges from a lowest degree corresponding to a deviation which leads to excessive stock to a highest degree corresponding to a deviation which provides for permissible stock.

3. The system according to claim 1, wherein the actual production start time calculating means calculates the actual production start time by tracing back the ideal production start time.

4. The system according to claim 3, wherein the actual production start time calculating means calculates the actual production start time by giving preference to product items with lower satisfaction degrees.

5. The system according to claim 1, further comprising means for displaying the satisfaction degree along with the calculated actual production start time.

6. The system of claim 1, wherein the satisfaction degree memory means stores two different satisfaction degrees, the satisfaction degrees defined as a non-linear function of a difference between the ideal production start time for a corresponding ordered product item and an actual production start time.

7. A method of working out production start plans by a computer, comprising the steps of:

making a preliminary retrieval of a production condition representing a time interval from a production start until a shipment of each product item and of a satisfaction degree corresponding to a deviation from an ideal production start time of each product item relative to an actual production start time;

calculating the ideal production start time of each product item from accepted order specifications and the production condition;

calculating an actual production start time by tracing back part of the ideal production start time and giving preference to product items with lower satisfaction degrees, when the calculated ideal production start time surpasses the production start capacity; and generating a production start plan based on the actual production start time of each product item;

wherein the step of calculating the ideal production start time and the step of calculating the actual production start time are executed when the order specifications indicative of a quantity and a delivery term of each product item are accepted.

8. The method of claim 7, wherein the step of making a preliminary retrieval comprises retrieving two different satisfaction degrees, the satisfaction degrees defined as a non-linear function of a difference between the ideal production start time and an actual production start time of a corresponding product item.

9. A computerized system for determining production start times for ordered product items, comprising:

means for converting accepted order information into digital accepted order signals, the accepted order information embodying a quantity and delivery term of the ordered product items;

means for converting production condition data into digital production condition signals, the production condition data embodying a time interval between starting production of the ordered product items and shipment of the ordered product items;

means for storing the digital accepted order signals, the digital production condition signals, calculated ideal production start time data and satisfaction degree data;

means for calculating the ideal production start time data based upon the digital accepted order signals and the digital production condition signals; and means for calculating actual production start time data based upon the calculated ideal production start time data and the satisfaction degree data, the satisfaction degree data corresponding to a deviation from the ideal production start time relative to an actual production start time for each ordered product item.

10. The system of claim 9, further comprising means for adjusting actual production start times of ordered product items based upon the calculated actual production start time data.

11. The system of claim 9, wherein the satisfaction degree data ranges between a lowest degree corresponding to a deviation that produces an excessive stock and a highest degree corresponding to a deviation that produces a permissible stock.

12. The system of claim 11, wherein the lowest degree corresponds to zero and the highest degree corresponds to one.

13. The system of claim 9, wherein the actual production start time data is calculated by giving preference to ordered product items having low satisfaction degrees.

14. The system of claim 9, further comprising means for displaying the satisfaction degree data together with the calculated actual production start time data.

15. The system of claim 9, wherein the means for storing the satisfaction degree data stores a non-linear function of a difference between the ideal production start time for a corresponding ordered product item and an actual production start time.

16. The system of claim 9, wherein the satisfaction degree data is input or corrected by an operator.

17. The system of claim 9, further comprising means for storing correction data and means for correcting the ideal production start time data based upon the correction data, the actual production start time data being calculated from the corrected ideal production start time data and the satisfaction degree data.

18. The system of claim 17, wherein the correction data includes at least one of equipment condition data, plan work-out condition data and leveling condition data.

19. A method for controlling production in an automated manufacturing plant, comprising:

inputting into a computer processor accepted order data embodying a quantity and delivery term of ordered product items and production condition data embodying a time interval between starting production of the ordered product items and shipment of the ordered product items;

using the computer processor to calculate ideal production start time data based upon the accepted order data and the production condition data;

using the computer processor to calculate actual production start time data based upon the calculated ideal production start time data and satisfaction degree data, the satisfaction degree data corresponding to a deviation from the ideal production start time relative to an actual production start time for each ordered product item; and starting production of each ordered product item in accordance with the actual start time data.

20. The method of claim 19 including the further steps of:

inputting into the computer processor correction data; and using the computer processor to calculate corrected ideal production start time data based upon the correction data, wherein the actual production start time data is calculated from the corrected ideal production start time data and the satisfaction degree data.

21. The method of claim 20, wherein the correction data includes at least one of equipment condition data, plan work-out condition data and leveling condition data.

22. A computer-readable recording medium that stores a control program for controlling production of ordered product items, comprising:

instructions for calculating ideal production start time data based upon accepted order information embodying a quantity and delivery term of ordered product items and production condition data embodying a time interval between starting production of the ordered product items and shipment of the ordered product items;

instructions for calculating actual production start time data based upon the calculated ideal production start time data and satisfaction degree data, the satisfaction degree data corresponding to a deviation from the ideal production start time relative to an actual production start time for each ordered product item; and instructions for adjusting actual production start times of ordered product items based upon the calculated actual production start time data.

23. The recording medium of claim 22, further comprising instructions for calculating corrected ideal production start time data based upon correction data, wherein the actual production start time data is calculated from the corrected ideal production start time data and the satisfaction degree data.

* * * * *